(12) United States Patent
Li et al.

(10) Patent No.: US 8,855,196 B2
(45) Date of Patent: Oct. 7, 2014

(54) ADAPTIVE MOTION INFORMATION COST ESTIMATION WITH DYNAMIC LOOK-UP TABLE UPDATING

(75) Inventors: Zhen Li, Cupertino, CA (US); Alexandros Tourapis, Burbank, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 985 days.

(21) Appl. No.: 12/863,923

(22) PCT Filed: Jan. 21, 2009

(86) PCT No.: PCT/US2009/031493
§ 371 (c)(1),
(2), (4) Date: Jul. 21, 2010

(87) PCT Pub. No.: WO2009/094349
PCT Pub. Date: Jul. 30, 2009

(65) Prior Publication Data
US 2010/0316118 A1    Dec. 16, 2010

Related U.S. Application Data

(60) Provisional application No. 61/022,787, filed on Jan. 22, 2008.

(51) Int. Cl.
| | | |
|---|---|---|
| H04N 7/12 | (2006.01) |
| H04N 11/02 | (2006.01) |
| H04N 11/04 | (2006.01) |
| H04N 19/15 | (2014.01) |
| H04N 19/149 | (2014.01) |
| H04N 19/19 | (2014.01) |
| H04N 19/147 | (2014.01) |
| H04N 19/91 | (2014.01) |
| H04N 19/51 | (2014.01) |
| H04N 19/567 | (2014.01) |

(52) U.S. Cl.
CPC ... *H04N 19/00672* (2013.01); *H04N 19/00187* (2013.01); *H04N 19/00181* (2013.01); *H04N 19/00351* (2013.01); *H04N 19/00175* (2013.01); *H04N 19/00951* (2013.01); *H04N 19/00696* (2013.01)
USPC ............ 375/240.02; 375/240.16; 375/240.12; 375/240.14; 375/240.15; 375/240.23; 375/240.25; 375/240.26; 375/240.18; 375/240.27; 375/240.01

(58) Field of Classification Search
CPC .................. H04N 19/00672; H04N 19/00351; H04N 19/00696; H04N 19/00187; H04N 19/00175; H04N 19/00181; H04N 19/00951
USPC ............ 375/240.02, 240.12, 240.07; 382/239
IPC .................................................. H04N 7/26, 7/50
See application file for complete search history.

(56) References Cited

U.S. PATENT DOCUMENTS

| | | | |
|---|---|---|---|
| 6,900,748 B2 | 5/2005 | Marpe et al. | |
| 7,471,724 B2 * | 12/2008 | Lee | 375/240.12 |
| 7,653,130 B2 * | 1/2010 | Joyce et al. | 375/240.07 |
| 2005/0013369 A1 * | 1/2005 | Lee | 375/240.12 |
| 2005/0036551 A1 | 2/2005 | Winger et al. | |
| 2005/0123207 A1 * | 6/2005 | Marpe et al. | 382/239 |
| 2005/0249291 A1 * | 11/2005 | Gordon et al. | 375/240.18 |
| 2007/0153897 A1 * | 7/2007 | Yan | 375/240.16 |

FOREIGN PATENT DOCUMENTS

WO   2006004305   1/2006

OTHER PUBLICATIONS

Siwei Ma et al: "Rate-distortion analysis for H. 264/AVC video coding and its application to rate control" IEEE Transactions on Circuits and Systems for Video Technology, IEEE Service Center, Piscataway, NJ, US, vol. 15, No. 12, Dec. 1, 2005, pp. 1533-1544.

Zhen Li et al: "Motion estimation with entropy coding considerations in H .264/AVC " Image Processing, 2008. ICIP 2008. 15th IEEE International Conference on, IEEE, Piscataway, NJ, USA, Oct. 12, 2008, pp. 2140-2143.

Altunbasak Y et al: "Low-Complexity Rate-Distortion Optimal Macroblock Mode Selection and Motion Estimation for MPEG-Like Video Coders" IEEE Transactions on Circuits and Systems for Video Technology, IEEE Service Center, Piscataway, NJ, US, vol .15, No. 7, Jul. 1, 2005, pp. 823-834.

Li H et al: "A Novel PDE-Based Rate-Distortion Model for Rate Control" IEEE Transactions on Circuits and Systems for Video Technology, IEEE Service Center, Piscataway, NJ, US, vol. 15, No. 11, Nov. 1, 2005, pp. 1354-1364.

Marpe D et al: "Context-based adaptive binary arithmetic coding in the H.264/AVC video compression standard" IEEE Transactions on Circuits and Systems for Video Technology, IEEE Service Center, Piscataway, NJ, US, vol. 13, No. 7, Jul. 1, 2003, pp. 620-636.

Quqing Chen et al: A Fast Bits 1-10 Estimation Method for Rate-Distortion Optimization in H.264/AVCn 24. Picture Coding Symposium;Dec. 15, 2004-Dec. 17, 2004; San Fransisco,, Dec. 15, 2004.

ISO/IEC JTC 1, "Coding of moving pictures and associated audio for digital storage media at up to about 1.5 Mbit/s—Part 2: Video," ISO/IEC 11172 (MPEG-1), Nov. 1993.

ITU-T and ISO/IEC JTC 1, "Generic coding of moving pictures and associated audio information—Part 2: Video," ITU-T Rec. H.262 and ISO/IEC 13818-2 (MPEG-2), Nov. 1994.

ISO/IEC JTC 1, "Coding of audio-visual objects—Part 2: Visual," ISO/IEC 14496-2 (MPEG-4 Part 2), Jan. 1999.

ITU-T, "Video codec for audiovisual services at px64 kbits/s," ITU-T Rec. H.261, v2: Mar. 1993.

ITU-T, "Video coding for low bit rate communication," ITU-T Rec. H.263, v2: Jan. 1998.

"Advanced video coding for generic audiovisual services" ITU-T Rec. H.264/ISO/IEC 14496-10 AVC, Mar. 2005.

SMPTE 421M, "VC-1 Compressed Video Bitstream Format and Decoding Process", Apr. 2006.

G. J. Sullivan and T. Wiegand, "Rate-distortion optimization for methods for video compression," IEEE Signal Processing Magazine, vol. 15, pp. 74-90, Nov. 1998.

D. Marpe, H. Schwarz, and T. Wiegand, "Context-based adaptive binary arithmetic coding in the H.264/AVC video compression standard," IEEE Transactions on Circuits and Systems for Video Technology, vol. 13, No. 7, Jul. 2003, pp. 620-636.

D. Marpe, G. Blattermann, and T. Wiegand, "Proposed editorial changes and cleanup of CABAC," JVT-D019, Klagenfurt, Austria, Jul. 2002.

* cited by examiner

*Primary Examiner* — Thao X Le
*Assistant Examiner* — Long Le
(74) *Attorney, Agent, or Firm* — Barcelo, Harrison & Walker, LLP

(57) ABSTRACT

Adaptive motion information cost estimation is achieved in processing video information. A transmission cost is estimated that is associated with encoding a motion vector difference (mvd) in motion vectors that describe a motion characteristic of the video information. The mvd is encoded based on minimizing a rate estimation mismatch associated with the motion vectors. The encoding step includes computing a bit count associated with the mvd using CABAC. A value is indexed that corresponds to the cost from one or more entries in the lookup table. The cost relates to context or content characteristics associated with the video information. The lookup table is adaptively updated based on a change in the contextual information or content characteristics. The value is dynamically adjustable based on the change.

28 Claims, 6 Drawing Sheets

800 Example Procedure for Processing Video Information

801　　Estimate a transmission cost associated with encoding a difference between motion vectors, which are descriptive of a motion characteristic of the video information
↓
802　　Encode the motion vector difference on the basis of minimizing a rate estimation mismatch associated with the motion vectors, in which a bit count is computed 811 associated with the motion vector difference using context adaptive binary arithmetic coding

FIG. 8A

Example Procedure 830, in which Updating step 823 is performed selectively based at least in part on a motion characteristic associated with the video information content:

831　　Analyze the video information on the basis of the motion attribute
↓
832　　Detect a granularity in the motion attribute
↓
　　　　<high motion content detected?>- NO ->　　823 Perform Updating step
　　　　　　　　|　　　　　　　　　　　　　　　　　　　　|
　　　　　　　YES　　　　　　　　　　　　　　　　　　　V
　　　　　　　|　　　　　　　　　Perform Indexing step 821 based at least in part on the updating step
↓
Perform Indexing step 821 based at least in part on an existing entry in the lookup table

FIG. 8C

First Example Estimating step 801
821 Access lookup table
|
V
822    Index a value that corresponds to the cost from one or more entries in the lookup table, in which the cost relates to at least one of contextual information or content characteristics associated with the video information
|
V
823    Adaptively update the lookup table based at least in part on a change in the contextual information or content characteristics, in which the value is dynamically adjustable based at least in part on the change Second Example Estimating step 801
Perform steps 821, 822 & 823
|
V
823    Model the encoding costs for the motion vector differences; e.g., update the modeled encoding cost
|
V
834    Collect the encoding costs associated with actual encoding rates of the motion vector differences
|
V
835 Update the modeled encoding cost based at least in part on statistical fittings associated with the modeling step First Example Updating step 823a
841    Collect an encoding rate for each of the encoded motion vector differences over a total number of occurrences for a block
|
V
842    Process an average cost based on the collected encoding rates and the total number of occurrences
(e.g., 891 Selectively collect the encoding rate for motion vector differences that have values equal to a power of 2, in which the processing step (842) is based at least in part on the selectively collecting step)
|
V
843    Enter a value for a corresponding cost for encoding the motion vector differences to the lookup table based on the processing step Second Example Updating step 823b
861    Collect an encoding rate for each of the encoded motion vector differences over a total number of occurrences for a block
|
V
862    Process an average cost based at least in part on the collected encoding rates, the total number of occurrences and the weighting coefficient, in which the weighting coefficient is processed based on the total number of occurrences of an encoding rate over the block
|
V
863    Enter a value for a corresponding cost for encoding the motion vector differences to the lookup table based at least in part on the processing step

ADAPTIVE MOTION INFORMATION COST ESTIMATION WITH DYNAMIC LOOK-UP TABLE UPDATING

RELATED APPLICATION AND CLAIM OF BENEFIT AND PCT STATUS

This Application is related to U.S. Provisional Patent Application No. 61/022,787, filed on Jan. 22, 2008, by Zhen Li and Alexandros Tourapis entitled "Adaptive Motion Information Cost Estimation," and claims priority and full benefit thereof, and is assigned to the Assignee thereof (with Dolby Laboratories IP Legal Reference No. D08001 US01), which is incorporated herein by reference for all purposes as though fully set forth herein. This Application is filed pursuant to the Patent Cooperation Treaty (PCT).

TECHNOLOGY

The present invention relates generally to video processing. More specifically, embodiments of the present invention relate to adaptive motion information cost estimation.

BACKGROUND

In video coding systems, motion-compensated prediction (MCP) may be used to exploit temporal correlation that may exist within a video sequence. MCP supports efficient coding of video information content. MCP is described in current video coding standards, including MPEG-1, MPEG-2, MPEG-4, H.261, H.263, MPEG-4 AVC/ITU-T H.264, and VC-1. A number of modem video coding systems may use MCP.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 8A, 8B and 8C depict flowchart of example procedures, according to embodiments of the present invention.

DESCRIPTION OF EXAMPLE EMBODIMENTS

Adaptive motion information cost estimation is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

I

Overview

A. Example Video Coding System Platforms

Example embodiments described herein relate to adaptive motion information cost estimation. Some modem video coding systems use MCP (motion-compensated prediction) to exploit temporal correlation that may exist within a video sequence and efficiently code video information content. Video coding may be performed with an encoder system and a decoder system.

Figure 1:
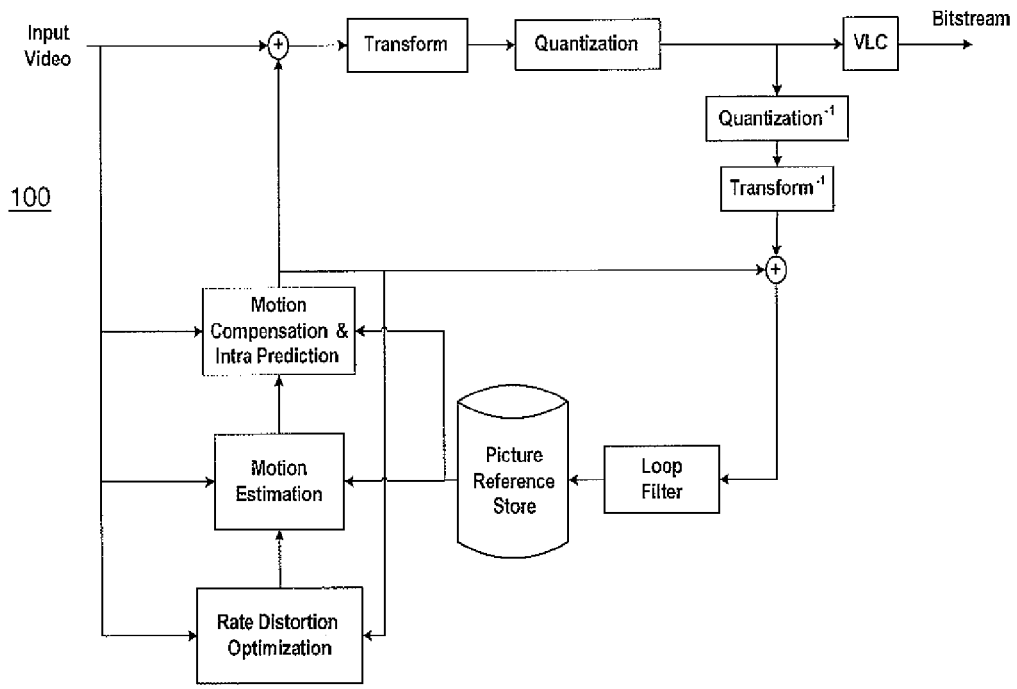
FIG. 1 depicts an example video encoder platform, with which an embodiment of the present invention may be implemented.

FIG. 1 depicts an example video encoder platform 100, with which an embodiment of the present invention may be implemented. Encoder 100 substantially conforms to the Advanced Video Codec (MPEG 4 AVC/ITU-T H.264). A video input is transformed, e.g., from the time domain to the frequency domain, in transform module 101.

Wavelet and/or various Fourier type transforms may be used, including the discrete cosine transform (DCT) and variants such as the modified DCT (MDCT). The transformed signal is quantized in a quantization module 102. The quantized transformed signal is subjected to variable length coding (VLC) in VLC module 104 to generate an export bitstream, which includes a digitized representative of the video input.

The quantized transformed signal is also subjected to inverse quantization in quantization inverter 105 and inverse transformation (e.g., inverse MDCT applied to a signal that has been transformed by MDCT) in transformation inverter 106 for processing applications within encoder 100 that include generation of reference pictures. The inversely quantized and inversely transformed signal is filtered in a loop filter 107, from which reference pictures are stored in reference picture storage 108. The video input is also fed to motion estimator 109, motion compensation (and intra-frame prediction) unit 110, and rate distortion optimizer 111. Motion estimator 109 generates estimates of motion within the video content with application of statistically based analysis and other estimation techniques to information within the video input signal.

The motion estimates are received by motion compensation unit 110, which also accesses relevant reference picture information that is stored in reference picture storage 108. Motion compensation unit 110 processes the video input signal with the motion estimate and reference picture information to generate a motion compensation signal which is summed 112 with the video input signal for input to transformation module 101. The motion compensation signal is also summed 113 with the inversely quantized and inversely transformed signals to the loop filter 107. Further, the motion compensation signal provides an input to rate distortion optimizer 111.

Rate distortion optimizer 111 processes video information in the input signal along with the motion compensation signal to generate a rate distortion optimizing signal. Rate distortion optimizer 111 may adaptively process the input signal video information and the motion compensation signal according to an embodiment of the present invention. The rate distortion optimizing signal may thus be derived according to one or more procedures described herein. The rate distortion optimizing signal provides an input to motion estimator 109. Thus, the motion estimation signal input to motion compensation unit 110 and the motion compensation signal generated therewith may be based, at least in part, on processing performed according to an embodiment of the present invention.

Figure 2:
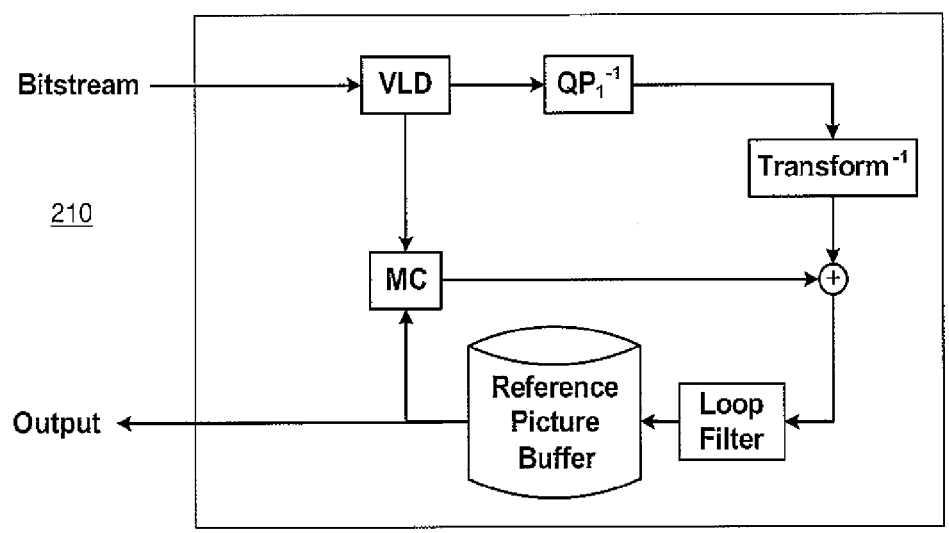
FIG. 2 depicts an example video decoding platform, with which an embodiment of the present invention may be implemented.

FIG. 2 depicts an example video decoding platform 200, with which an embodiment of the present invention may be implemented. Decoder 200 may, in a sense, be somewhat simpler in structure and/or function than encoder 100 (FIG. 1). The bitstream exported by example encoder 100 provides an input to decoder 200, which is processed with variable length decoding (VLD) by in VLD module 201.

The bitstream signal thus decoded provides an input to motion compensation unit 210. The decoded signal is subjected to inverse quantization in quantization inverter 205 and inverse transformation (e.g., inverse MDCT applied to a signal that has been transformed by MDCT) in transformation inverter 206 for generating video output and other processing applications within decoder 200. The inversely quantized and inversely transformed signal is summed with a motion compensation signal from motion compensator 210 and filtered in a loop filter 207. Reference pictures are stored in reference picture buffer 208. A video output signal may be retrieved from picture buffer 208 and provided as an input to motion compensator 210.

Motion compensator 210 processes the decoded bitstream input from VLD unit 201 with the video output to generate the motion compensation signal, which is summed 212 with the inversely quantized and inversely transformed signal for input to loop filter 207. The video output signal may be exported by decoder 200 for display or further processing (e.g., upon export).

B. Motion-Compensated Prediction

Example embodiments described herein relate to adaptive motion information cost estimation (MCP). The embodiments may be useful for image and video processing, for instance with video coding systems. MCP estimates motion in video content. Motion estimation may be processed as an essentially Lagrangian cost function, which balances (1) an accuracy of motion prediction that may be achieved, and (2) a data rate needed to transmit motion related information. For instance, motion estimation may be computed as a minimization problem of a Lagrangian cost function, which is defined according to Equation 1, below.

$$m = \underset{m \in M}{\operatorname{argmin}} J(m, \lambda_{MOTION}) = \underset{m \in M}{\operatorname{argmin}} \{SAD(s, c(m)) + \lambda_{MOTION} \cdot R(m - p)\} \quad \text{(Equation 1.)}$$

In Equation 1, S represents the source data, $m=(m_x, m_y)^T$ the motion vector to be predicted, $c(m)$ the motion compensated reference, SAD $(s, c(m))$ the predicted difference (wherein SAD is the sum of absolute differences), M the set of all candidate motion vectors, $p=(p_x, p_y)^T$ the prediction for the motion vector, and $\lambda_{MOTION}$ the Lagrange multiplier. The term $R(m-p)$ within Equation 1 represents the rate for the predicted motion vector difference (mvd) $(m-p)$ and thus represents the cost to transmit the motion information.

Motion information may be losslessly encoded with entropy coding. The Advanced Video Codec specification H.264/AVC for instance defines two (2) distinct entropy coding methods. The entropy coding methods specified for H.264/AVC include context adaptive variable length coding (CAVLC) and context adaptive binary arithmetic coding (CABAC).

Encoding motion information with CABAC counts the exact bits that are needed to represent a motion vector. An encoder may encode the motion vector difference 'mvd' and constructs a context model for every motion vector difference. Further, context models may be updated during the encoding, which can significantly increase computational complexity. To simplify the computational requirements demanded for motion estimation in which large numbers of motion vector candidates may be evaluated for every block or macroblock, $R(m-p)$ may be estimated using a look-up table (LUT). The LUT may include the Universal Variable Length Code (UVLC).

A rate for the motion vector difference may be computed with UVLC according to Equation 2, below.

$$R_{UVLC}(mvd) = \begin{cases} 1, & |mvd| = 0 \\ 2*\lfloor \log_2|mvd| \rfloor + 3, & |mvd| > 0 \end{cases} \quad \text{(Equation 2.)}$$

In Equation 2, $\lfloor \cdot \rfloor$ represents the floor operation. Equation 2 thus presents a closed-form approximation, which can significantly reduce computational complexity for the mvd rate that may be encoded with CABAC.

The estimated rate $R_{UVLC}$ (mvd) is accurate for entropy coding in which CAVLC is used. Using CABAC, the estimated rate $R_{UVLC}$ (mvd) may differ from the actual mvd rate. Where the estimated rate $R_{UVLC}$ (mvd) differs from the actual mvd rate, motion estimation results computed according to Equation 1 may be affected when CABAC is used. The difference between the estimated rate $R_{UVLC}$ (mvd) and the actual mvd rate may be referred to herein as a motion vector rate estimation mismatch (MV-REM).

C. Properties of Motion Vector Rate Estimation Mismatches

Figure 3A:
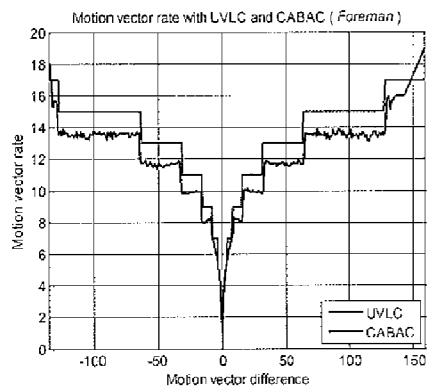
FIGS. 3A and 3B depict examples of motion vector difference rates.

Properties that may characterize MV-REM are described herein with reference to standard common intermediate format (CIF) test sequences. FIG. 3A depicts an example of motion vector difference (mvd) rates computed over the CIF test sequence familiar to artisans skilled in fields relating to video and image processing as "Foreman." FIG. 3B depicts an example of mvd rates computed by the CIF test sequence familiar to artisans skilled in fields relating to video and image processing as "Football." In FIGS. 3A and 3B, a motion vector rate 'UVLC' and a motion vector rate 'CABAC' are plotted as functions of motion vector differences that are computed with UVLC and CABAC, respectively.

Figure 3B:
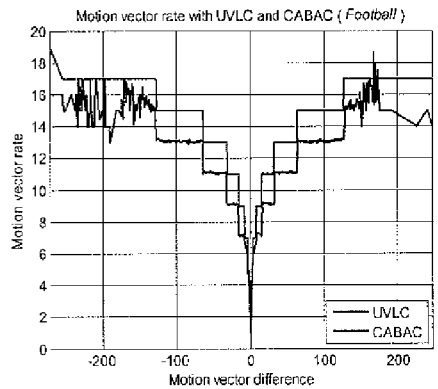
Figure 4A:
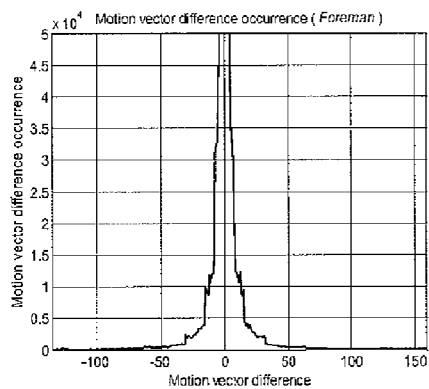
FIGS. 4A and 4B depict examples of count computations for the motion vector differences that are shown in FIGS. 3A and 3B, respectively.
Figure 4B:
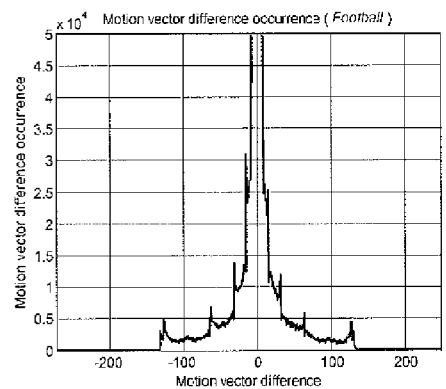
Figure 5A:
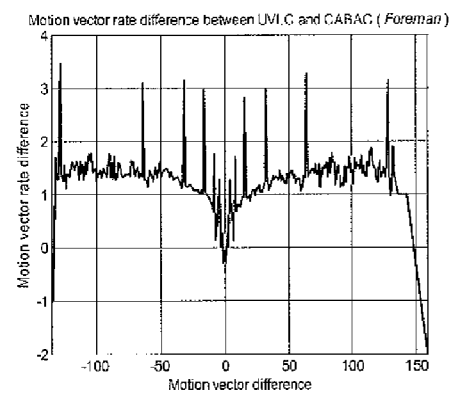
FIGS. 5A and 5B depict examples of rate estimation mismatches for the motion vector difference count computations that are shown in FIGS. 4A and 4B, respectively.
Figure 5B:
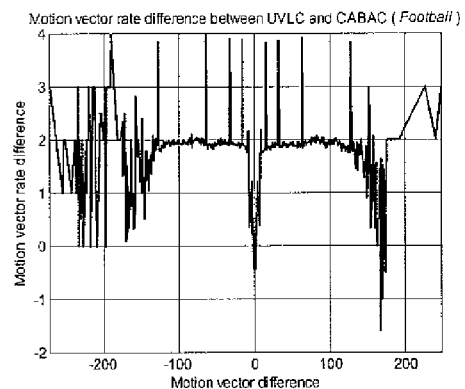

FIGS. 4A and 4B depict examples of count computations for the motion vector differences that are shown in FIGS. 3A and 3B, respectively. Counts of occurrences of motion vector differences computed with UVLC and CABAC are plotted as functions of motion vector difference for the Foreman and Football CIF test sequences, respectively. FIGS. 5A and 5B depict examples of rate estimation mismatches for the motion vector difference count computations that are shown in FIGS. 4A and 4B, respectively. Differences in motion vector rates computed with UVLC and CABAC are plotted for the Foreman and Football CIF test sequences, respectively.

The plots over FIG. 3A through 5B reveal characteristics of MV-REM in these CIF test sequences. For instance, MV-REM is not trivial. On the contrary: particularly with relatively large mvd, MV-REM may significant. With respect to distance-preservation for medium to high motion content and distance-variation for low motion content, MV-REM may rise with the underlying mvd rate. However, MV-REM may remain relatively constant for the same underlying rate in medium to high motion contents. Except at several peaks, the difference in the estimated UVLC rates for two motion vector candidates may approximate the actual CABAC rate difference. For low motion contents however, more MV-REM fluctuations may exist.

With respect to boundary singular conditions, MV-REM may be more significant, perhaps substantially, when |mvd| is expressed as a power of 2. This may result from the fact that code lengths of UVLC and CABAC in codecs such as H.264/AVC increase at different mvd values. The UVLC rate, as shown in Equation 2 above, increases at |mvd|=2n. Thus, mvd with the property 2n−1≤|mvd|≤2n−1 may share the same estimated UVLC coding length, which is 2 bits shorter than that of |mvd|=2n.

In contrast, for CABAC encoded mvd, Unary/k-th Exp-Golomb (UEGk) binarizations are defined in the H.264/AVC codec. For a given mvd, UEGk binarization may be constructed as follows. For the prefix part of the UEGk bin string, a truncated unary binarization with a cutoff value S is used for min(|mvd|, S). The unary code word for each unsigned integer valued symbol x≥0 includes a number 'x' of "one" (1) bits, plus a terminating "zero" (0) bit. Where |mvd|>9, the suffix may be constructed as an EGk codeword for x'=|mvd|−S to create a suffix of $$k + \left\lfloor \log_2\left(\frac{x'}{2^k} + 1\right) \right\rfloor$$

bits. To balance complexity and coding efficiency, S=9 and k=3 are selected and defined in the codec standard.

The expected code length of mvd may thus increase when $$\frac{x'}{2^k} + 1$$

is a power of 2, as shown in Equation 3, below.

$$\frac{x'}{2^k} + 1 = 2^{n'} \Rightarrow \frac{|mvd| - 9}{2^3} + 1 = 2^{n'} \Rightarrow |mvd| = 2^{n'+3} + 1 \quad \text{(Equation 3.)}$$

In Equation 3, n' is an integer. Thus, actual CABAC rates may increase at |mvd|=2n+1, with n=n'+3.

The asynchronization thus observed may arise as a result of the compromise between rate-distortion performance and encoder complexity. For instance, CABAC parameters are defined in H.264/AVC to optimize coding performance. However, the UVLC rate approximation may be used in practice with some encoders to reduce complexity. Significantly higher MV-REM may thus be introduced with CABAC at |mvd|=2n, as compared to other values. The UVLC approximation considers motion vectors with |mvd|=2n as more costly than those with 2n−1≤|mvd|≤2n−1 when their actual CABAC rates are statistically close.

Motion estimation computed according to Equation 1 above may be less likely to select motion vectors with |mvd|=2n, although distortion associated therewith does not differ significantly from that associated with CABAC. Similarly, UVLC approximations consider motion vectors with |mvd|=2n to incur substantially equal costs as those with |mvd|=2n+1, although the actual rate for the first is statistically lower and should thus be favored in the Lagrangian cost comparison of Equation 1, above. Thus, motion vector candidates with |mvd|=2n may be "unfairly" penalized in a sense, and may be less likely to be selected.

With respect to motion dependent conditions, MV-REM may vary with motion activity characteristic of the video content. The CABAC rate may be lower than the estimated UVLC rate for medium to high motion activity sequences. However, the CABAC rate is generally higher than the estimated UVLC rate for low motion activity sequences. Rate differences are significant in the comparison computed in Equation 1 above, such variations should not significantly affect the motion estimation decision.

With respect to isotropic conditions, MV-REM may be generally symmetric with respect to directional considerations. Although mismatches may exist, they may not cause irregularities of the estimated motion field, such as by preferring one particular direction over others.

D. Example Embodiment

An embodiment of the present invention functions to reduce MV-REM with low complexity adaptive rate estimation methods, which may allow CABAC based encoders to encode every mvd and count actual bits associated therewith. An embodiment of the present invention uses a LUT that is adaptively updated on the basis of content and context characteristics of the video that is being processed.

II

Example Procedures

A. Adaptively Updating LUT with Average Cost

An embodiment adaptively updates a LUT according to an average cost. The LUT is initialized. In an embodiment, the LUT may be initialized with the estimated cost using UVLC, as described in Equation 2, above. Motion estimation is computed for each block according to Equation 1, above. Motion estimation may be performed with motion vector costs read from the LUT. Upon selecting a motion vector, the selected motion vector is predictively coded and the mvd is entropy coded using CABAC. The encoded mvd is sent as part of the bitstream to the decoder.

For each encoded mvd=n, an actual encoding rate $R_n^i$, i=1, 2, ..., M is collected, in which M≥1 is the number of total occurrences of mvd=n up to a current block. Where $R_n^o$ represents an initial entry in the LUT for mvd=n obtained with table initialization, a corresponding cost for mvd=n, $\hat{R}_n^M$ may provide an updated LUT entry, as described in Equations 4A and 4B, below.

$$\hat{R}_n^0 = R_n^0 \qquad \text{(Equations 4A \& 4B.)}$$
$$\hat{R}_n^M = \frac{(M-1)\cdot \hat{R}_n^{M-1} + R_n^M}{M}, M \geq 1$$

B. Adaptively Updating LUT with Weighted Average Cost

An embodiment adaptively updates a LUT according to a weighted average cost.

For each encoded mvd=n, an actual encoding rate $R_n^i$, i=1, 2, ..., M is collected for every encoded mvd=n. An embodiment updates the LUT with a weighted average cost as shown in Equations 5A and 5B, below.

$$\hat{R}_n^0 = R_n^0 \qquad \text{(Equations 5A \& 5B.)}$$
$$\hat{R}_n^M = \sum_{i=0}^{M} w_i R_n^i, M \geq 1$$

In Equation 5B, $w_i$ represents a weighting coefficient. In an embodiment, the weighting coefficient $w_i$ may be selected according to Equation 5C, below.

$$w_i = \frac{i^k}{M} \qquad \text{(Equation 5C.)}$$

In Equation 5C, k is an integer value greater than zero (0).

C. Periodic Adaptive LUT Update

In an embodiment, the actual encoding rate for mvd=n is collected for every Nth occurrence. The corresponding LUT entry may be adaptively updated with an average cost or a weighted average cost, e.g., as described in Sections II. A. and II. B., above. The present embodiment may reduce complexity for context updating by N times, e.g., over another approach.

D. Selective Adaptive LUT Update

In an embodiment, a part of the LUT is updated according to the context characteristics of the mvd. Rate mismatch at powers of 2 may be more significant than at other values. In an embodiment, an actual encoding rate for mvd values equal to powers of 2 is selectively collected. Corresponding LUT entries may then be adaptively updated with an average cost, a weighted average cost, or periodically, e.g., as described in Sections H. A., II. B. and II. C., above. Selectively collecting actual encoding rate for mvd values equal to powers of 2 and adaptively updating the LUT in conjunction with average cost, weighted average cost or periodically may reduce complexity for context updating and increase efficiency.

E. Selective LUT Update with Pre-Analysis

In an embodiment, a part of the LUT is updated according to characteristics of the video content. As described above, the difference of MV-REM for two motion vector candidates may be more significant for low motion content than for high motion contents. In an embodiment, pre-analysis is performed on the video content. Where the pre-analysis suggests that the content or a particular area or segment in the video content has characteristics associated with high motion, the current entry in the LUT is used. However, where pre-analysis reveals low motion content, the actual encoding rates are collected. Corresponding entries at the LUT may then be updated with an average cost, a weighted average cost, periodically or selectively, e.g., as described in Sections II. A., II. B., II. C. and II. D., above. In an embodiment, selective LUT updates may use pre-analysis to detect granularities in terms of motion. Thus, in view of their individual pre-analyzed motion characteristics different regions or frames may apply distinct update procedures. For example, periodic LUT updates may be performed that use distinct values for N.

F. Parameterized LUT Update

In an embodiment, motion information cost is modeled as a parameterized function of mvd. Modeling motion information cost is modeled as a parameterized function of mvd may obviate direct updating of the LUT entries. For instance, motion information cost may be modeled as a quadratic function of mvd, as described in Equation 6, below.

$$R(mvd) = m_1 \cdot mvd^2 + m_2 \cdot mvd + m_3 \qquad \text{(Equation 6)}$$

In Equation 6, $m_1$, $m_2$ and $m_3$ represent model parameters. With every collected actual encoding rate for mvd=n, model parameters may be updated using statistical fitting methods. The model parameters may be updated for part or all occurrences of mvd. The LUT may then be adaptively updated with the updated model parameters.

G. Comparative Examples

Figure 6:
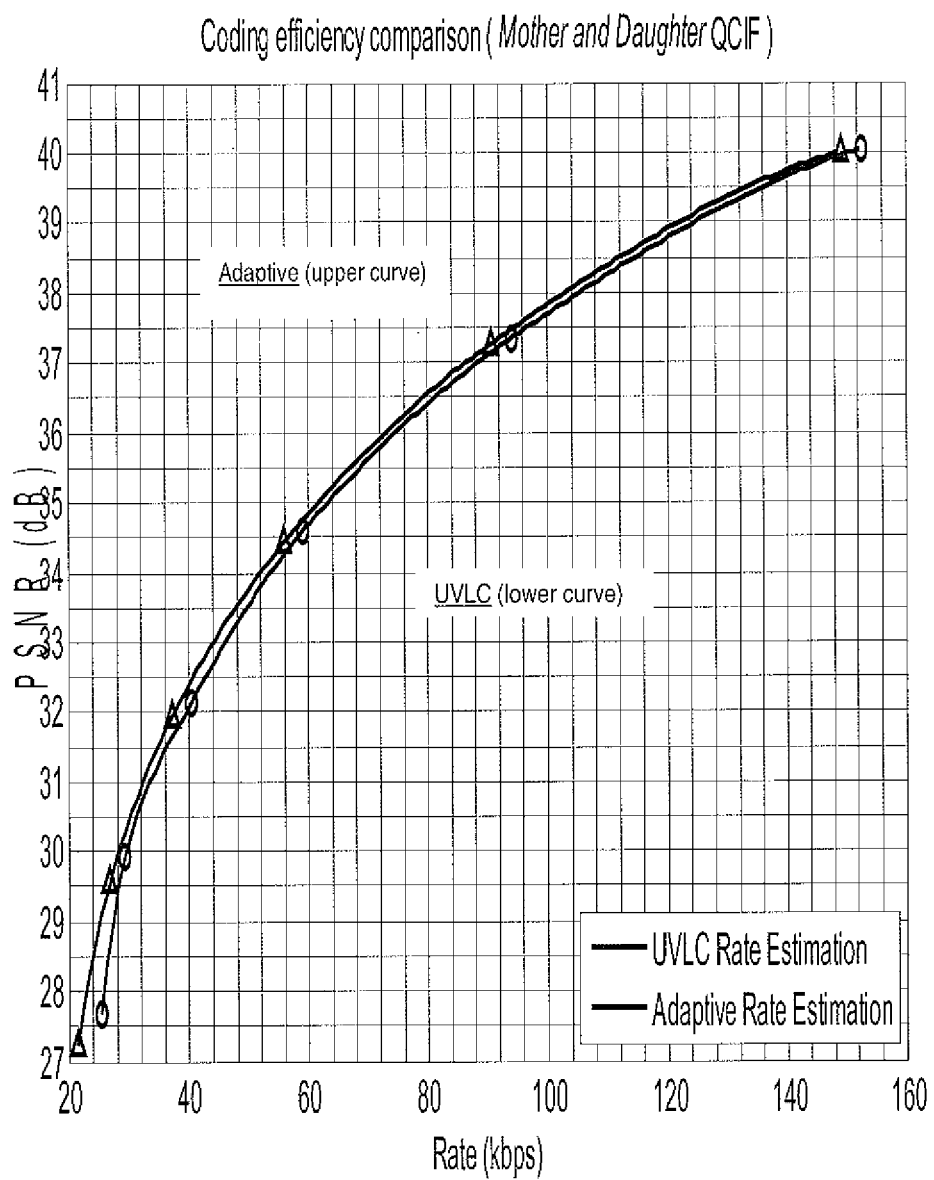
FIG. 6 and FIG. 7 depict example comparisons of coding efficiencies, according to an embodiment of the present invention.
Figure 7:
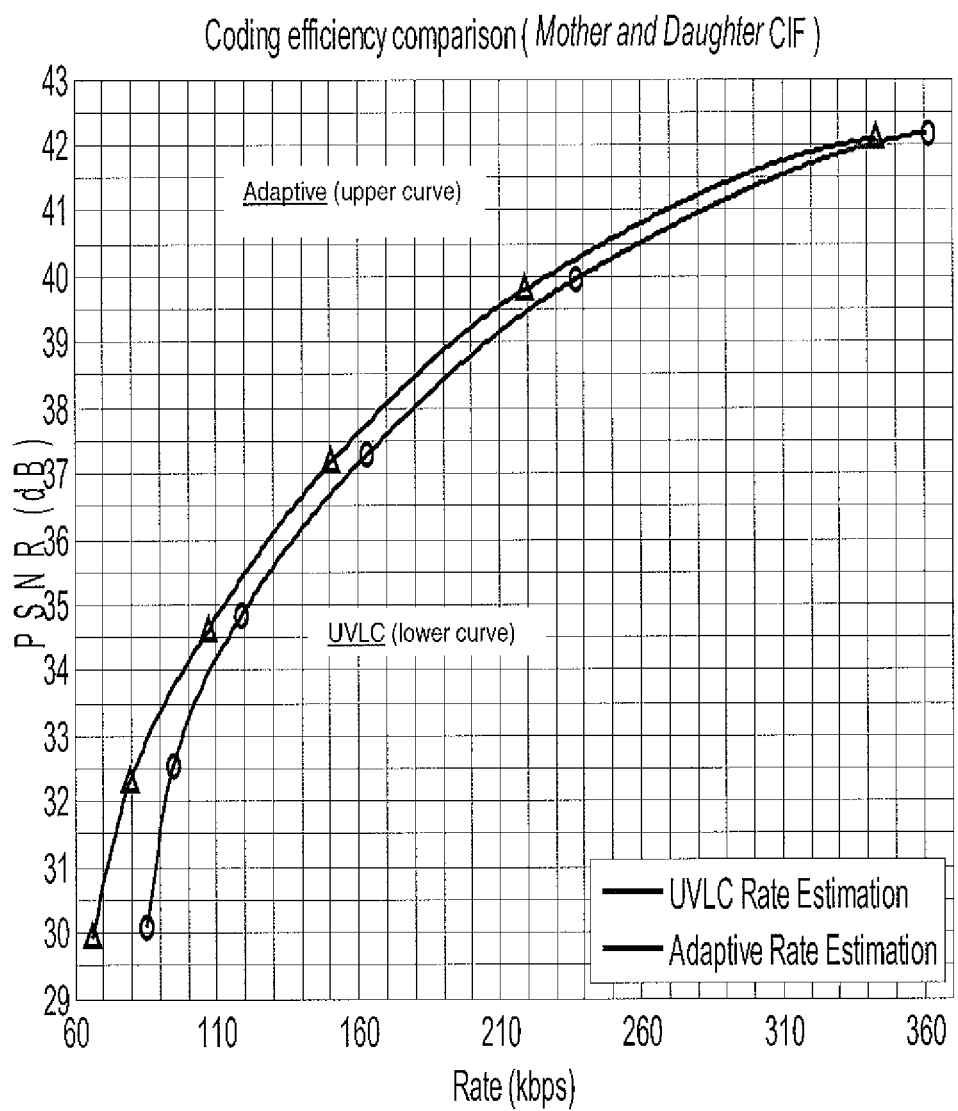

FIG. 6 and FIG. 7 depict example comparisons of coding efficiencies, according to an embodiment of the present invention. Rate cost estimates include adaptively updating the LUT with average cost, e.g., as described in Section II. A., above. The contents are encoded using an 8×8 inter prediction mode and low complexity rate distortion optimization. For the "Mother and Daughter test sequence" familiar to artisans skilled in video and image processing fields, adaptive estimation may achieve significant (e.g., ≤1.5 dB) gain with quarter common intermediate form (QCIF) content. Gains may be higher (e.g., ≤3 dB) with CIF content. Moreover, gain may be more significant with lower bit rates than with higher bit rates. Embodiments of the present invention may thus improve video coding efficiency. This benefit may be particularly significant with low complexity and low bit rate applications.

H. Example Procedure

Example embodiments of the present invention may relate to one or more of the descriptions that are enumerated in the paragraphs below. FIG. 8A depicts a flowchart of an example procedure 800, according to an embodiment of the present invention. FIG. 8B and FIG. 8C depict flowcharts of example procedures, according to embodiments of the present invention.

Enumerated example embodiment 1 comprises a method for processing video information, comprising the steps of:

estimating a transmission cost of CABAC encoding a difference between a motion vector, which is descriptive of a motion characteristic of the video information, and a predictor of the motion vector;
   wherein the estimating step comprises the steps of:
   initializing a lookup table;
   accessing the lookup table;
   retrieving a cost value that is indexed by the motion vector difference from the lookup table; and
   adaptively updating the cost value in the lookup table based at least on a collected actual encoding rate of the motion vector difference.

Enumerated example embodiment 2 comprises a method as recited in enumerated example embodiment 1 wherein the encoded difference between the motion vector and the predictor thereof comprise one of a plurality of encoded differences between motion vectors and the predictors each thereof; and
   wherein the updating step comprises the steps of:
   collecting an encoding rate for each of the encoded differences between motion vectors and the predictors each thereof;
   computing an average cost value of the collected encoding rates for each of the encoded differences between motion vectors and the predictors each thereof; and
   entering the average cost value from the computing step for each motion vector difference in the lookup table.

Enumerated example embodiment 3 comprises a method as recited in enumerated example embodiment 2 wherein computing the average cost comprises a weighted average cost; and
   wherein the weighted average cost corresponds to the average cost weighted with a weighting coefficient.

Enumerated example embodiment 4 comprises a method as recited in enumerated example embodiment 2 wherein the updating step is performed periodically.

Enumerated example embodiment 5 comprises a method as recited in enumerated example embodiment 2 wherein the updating step is performed selectively based on a context characteristic associated with the motion vector difference.

Enumerated example embodiment 6 comprises a method as recited in enumerated example embodiment 2 wherein the collecting step comprises the step of:
   selectively collecting the encoding rate for motion vector differences that have values equal to a power of two (2); and
   wherein the computing step is based on the selectively collecting step.

Enumerated example embodiment 7 comprises a method as recited in either of enumerated example embodiments 2, 5 or 6 wherein the updating step is performed selectively based on a content characteristic associated with the video information.

Enumerated example embodiment 8 comprises a method as recited in enumerated example embodiment 7 wherein the content characteristic comprises a motion attribute associated with the video information content.

Enumerated example embodiment 9 comprises a method as recited in enumerated example embodiment 8, further comprising the steps of:
   analyzing the video information to extract the motion attribute;
   upon detecting high motion content, performing the retrieving step based on an existing entry in the lookup table; and
   upon detecting low motion content:
   performing the updating step; and
   performing the retrieving step after the updating step.

Enumerated example embodiment 10 comprises a method as recited in enumerated example embodiment 1, further comprising the steps of:
   modeling the encoding costs for the motion vector differences;
   collecting the actual encoding rates of the motion vector differences; and
   updating the modeled encoding cost based on statistical fittings;
   wherein the updating step comprises the step of updating the modeled encoding cost.

Enumerated example embodiment 11 comprises a method as recited in enumerated example embodiment 10 wherein the step of updating the modeled encoding cost is performed over at least a part, or all of the motion vector differences.

Enumerated example embodiment 12 comprises an encoder for video content, comprising a transmission cost estimator for estimating a transmission cost of CABAC encoding a difference between a motion vector, which is descriptive of a motion characteristic of the video information, and a predictor of the motion vector;
   wherein the transmission cost estimator is configured for:
   initializing a lookup table;
   accessing the lookup table;
   retrieving a cost value that is indexed by the motion vector difference from the lookup table; and
   adaptively updating the cost value in the lookup table based at least on a collected actual encoding rate of the motion vector difference.

Further example embodiments comprise an encoder as in enumerated example embodiment 12, wherein the transmission cost estimator is further configured for performing encoding functions using the steps recited in one or more of enumerated example embodiments 1-11.

Enumerated example embodiment 13 comprises a system, comprising:
   an encoder as recited in enumerated example embodiment 12, and
   a decoder for decoding the video content encoded by the encoder.

Further example embodiments comprise a system as in enumerated example embodiment 13, wherein the transmission cost estimator is further configured for performing encoding functions using the steps recited in one or more of enumerated example embodiments 1-11.

Enumerated example embodiment 14 comprises a computer readable storage medium comprising instructions which, when executed with one or more processors, cause or control a computer system to perform steps for processing video information, wherein the steps include one or more or all of the steps recited in enumerated example embodiments 1-11.

Enumerated example embodiment 15 comprises a computer readable storage medium comprising instructions which, when executed with one or more processors, configure an encoder as recited in enumerated example embodiment 12.

Enumerated example embodiment 16 comprises a computer readable storage medium comprising instructions which, when executed with one or more processors configure a system as recited in enumerated example embodiment 13.

18. A decoder (200) of video content, comprising means for performing encoding functions related to the steps recited in enumerated descriptions 1-15.

19. A computer readable storage medium comprising instructions which, when executed with one or more processors, configure an encoder (100) or a decoder (200) as recited in enumerated descriptions 16, 17 or 18.

20. A computer readable storage medium comprising instructions which, when executed with one or more processors, cause a computer system (100, 200) to perform steps for processing video information, wherein the steps include one or more of the steps recited in enumerated descriptions 1-15.

III

Equivalents, Extensions, Alternatives and Miscellaneous

Example embodiments for adaptive motion information cost estimation are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing video information, comprising the steps of:
   estimating a transmission cost of CABAC encoding a difference between a motion vector, which is descriptive of a motion characteristic of the video information, and a predictor of the motion vector;
   wherein the estimating step comprises the steps of:
      initializing a lookup table;
      accessing the lookup table;
      retrieving a cost value that is indexed by the motion vector difference from the lookup table; and
      adaptively updating the cost value in the lookup table based at least on a collected actual encoding rate of the motion vector difference.

2. The method as recited in claim 1 wherein the encoded difference between the motion vector and the predictor thereof comprise one of a plurality of encoded differences between motion vectors and the predictors each thereof; and
   wherein the updating step comprises the steps of:
      collecting an encoding rate for each of the encoded differences between motion vectors and the predictors each thereof;
      computing an average cost value of the collected encoding rates for each of the encoded differences between motion vectors and the predictors each thereof; and
      entering the average cost value from the computing step for each motion vector difference in the lookup table.

3. The method as recited in claim 2 wherein computing the average cost comprises a weighted average cost; and
   wherein the weighted average cost corresponds to the average cost weighted with a weighting coefficient.

4. The method as recited in claim 2 wherein the updating step is performed periodically.

5. The method as recited in claim 2 wherein the updating step is performed selectively based on a context characteristic associated with the motion vector difference.

6. The method as recited in claim 2 wherein the collecting step comprises the step of:
   selectively collecting the encoding rate for motion vector differences that have values equal to a power of two (2); and
   wherein the computing step is based on the selectively collecting step.

7. The method as recited in claim 2 wherein the updating step is performed selectively based on a content characteristic associated with the video information.

8. The method as recited in claim 7 wherein the content characteristic comprises a motion attribute associated with the video information content.

9. The method as recited in claim 8, further comprising the steps of:
   analyzing the video information to extract the motion attribute;
   upon detecting high motion content, performing the retrieving step based on an existing entry in the lookup table; and
   upon detecting low motion content:
      performing the updating step; and
      performing the retrieving step after the updating step.

10. The method as recited in claim 1, further comprising the steps of:
    modeling the encoding costs for the motion vector differences;
    collecting the actual encoding rates of the motion vector differences; and
    updating the modeled encoding cost based on statistical fittings;
    wherein the updating step comprises the step of updating the modeled encoding cost.

11. The method as recited in claim 10 wherein the step of updating the modeled encoding cost is performed over at least a part, or all of the motion vector differences.

12. An encoder for video content, comprising:
    a transmission cost estimator for estimating a transmission cost of CABAC encoding a difference between a motion vector, which is descriptive of a motion characteristic of the video information, and a predictor of the motion vector;
    wherein the transmission cost estimator is configured for:
       initializing a lookup table;
       accessing the lookup table;
       retrieving a cost value that is indexed by the motion vector difference from the lookup table; and
       adaptively updating the cost value in the lookup table based at least on a collected actual encoding rate of the motion vector difference.

13. The encoder as recited in claim 12 wherein the encoded difference between the motion vector and the predictor thereof comprise one of a plurality of encoded differences between motion vectors and the predictors each thereof; and
    wherein the transmission cost estimator is configured for updating the cost value in the lookup table by operations comprising:
       collecting an encoding rate for each of the encoded differences between motion vectors and the predictors each thereof;
       computing an average cost value of the collected encoding rates for each of the encoded differences between motion vectors and the predictors each thereof; and
       entering the average cost value from the computing for each motion vector difference in the lookup table.

14. The encoder as recited in claim 13 wherein computing the average cost comprises a weighted average cost; and
    wherein the weighted average cost corresponds to the average cost weighted with a weighting coefficient.

15. The encoder as recited in claim 13 wherein the transmission cost estimator is configured for performing the updating selectively based on a context characteristic associated with the motion vector difference.

16. The encoder as recited in claim 13 wherein the collecting comprises:
    selectively collecting the encoding rate for motion vector differences that have values equal to a power of two (2); and
    wherein the computing is based on the selectively collecting.

17. The encoder as recited in claim 13 wherein the transmission cost estimator is configured for performing the updating selectively based on a content characteristic comprising a motion attribute associated with the video information content.

18. The encoder as recited in claim 17, wherein the transmission cost estimator is further configured for:
    analyzing the video information to extract the motion attribute;
    upon detecting high motion content, performing the retrieving of the cost value based on an existing entry in the lookup table; and
    upon detecting low motion content:
        performing the updating; and
        performing the retrieving of the cost value after the updating.

19. The encoder as recited in claim 12, wherein the transmission cost estimator is further configured for:
    modeling the encoding costs for the motion vector differences;
    collecting the actual encoding rates of the motion vector differences; and
    updating the modeled encoding cost based on statistical fittings;
    wherein the updating comprises updating the modeled encoding cost.

20. A system, comprising:
    an encoder as recited in claim 12, and
    a decoder for decoding the video content encoded by the encoder.

21. A non-transitory computer readable storage medium comprising instructions which, when executed with one or more processors, cause or control a computer system to perform steps for processing video information, wherein the steps include:
    estimating a transmission cost of CABAC encoding a difference between a motion vector, which is descriptive of a motion characteristic of the video information, and a predictor of the motion vector;
    wherein the estimating step comprises the steps of:
        initializing a lookup table;
        accessing the lookup table;
        retrieving a cost value that is indexed by the motion vector difference from the lookup table; and
        adaptively updating the cost value in the lookup table based at least on a collected actual encoding rate of the motion vector difference.

22. The non-transitory computer readable storage medium as recited in claim 21 wherein the encoded difference between the motion vector and the predictor thereof comprise one of a plurality of encoded differences between motion vectors and the predictors each thereof; and
    wherein the updating step comprises the steps of:
        collecting an encoding rate for each of the encoded differences between motion vectors and the predictors each thereof;
        computing an average cost value of the collected encoding rates for each of the encoded differences between motion vectors and the predictors each thereof; and
        entering the average cost value from the computing step for each motion vector difference in the lookup table.

23. The non-transitory computer readable storage medium as recited in claim 22 wherein computing the average cost comprises a weighted average cost; and
    wherein the weighted average cost corresponds to the average cost weighted with a weighting coefficient.

24. The non-transitory computer readable storage medium as recited in claim 22 wherein the instructions cause or control the computer system to perform the updating step selectively based on a context characteristic associated with the motion vector difference.

25. The non-transitory computer readable storage medium as recited in claim 22 wherein the collecting step comprises the step of:
    selectively collecting the encoding rate for motion vector differences that have values equal to a power of two (2); and
    wherein the computing step is based on the selectively collecting step.

26. The non-transitory computer readable storage medium as recited in claim 22 wherein the instructions cause or control the computer system to perform the updating step selectively based on a content characteristic comprising a motion attribute associated with the video information content.

27. The non-transitory computer readable storage medium as recited in claim 26, wherein the instructions cause or control the computer system to further perform the steps of:
    analyzing the video information to extract the motion attribute;
    upon detecting high motion content, performing the retrieving step based on an existing entry in the lookup table; and
    upon detecting low motion content:
        performing the updating step; and
        performing the retrieving step after the updating step.

28. The non-transitory computer readable storage medium as recited in claim 21, wherein the instructions cause or control the computer system to further perform the steps of:
    modeling the encoding costs for the motion vector differences;
    collecting the actual encoding rates of the motion vector differences; and
    updating the modeled encoding cost based on statistical fittings;
    wherein the updating step comprises the step of updating the modeled encoding cost.

* * * * *